United States Patent Office 3,227,649
Patented Jan. 4, 1966

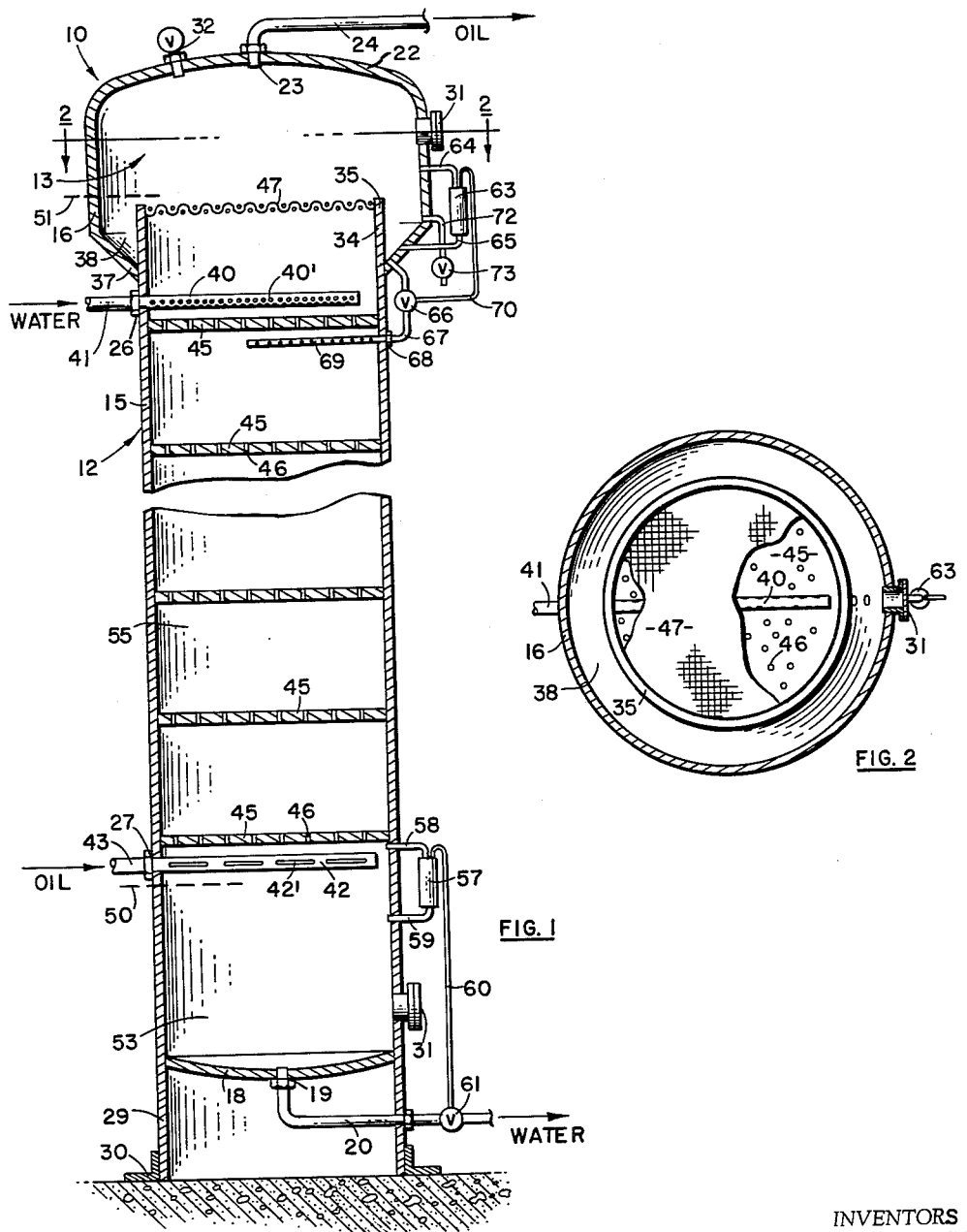

3,227,649
LIQUID-LIQUID CONTACT
Edward L. Ghormley, Northridge, and Nolan T. Stephens, Port Hueneme, Calif., assignors, by mesne assignments, to Struthers Scientific and International Corporation
Filed Aug. 13, 1962, Ser. No. 216,654
13 Claims. (Cl. 210—21)

This invention relates to intertreatment of two immiscible liquids of different specific gravities by passing them in counterflow direct-contact with each other. More particularly, the invention relates to improvements in direct-contact liquid-liquid treatment apparatuses and processes which promote separation of the liquids after they have been mixed, and which further provide for simple and efficient coalescing and removal of any contaminants and other matter separating from one or both of the liquids at their interfaces.

The invention provides especially advantageous results when embodied for heat exchange between two immiscible liquids. In the case of processes for demineralizing or desalting sea water for example, greatly increased efficiency can be had through employment of direct-contact heat exchange between water and oil. Sea water demineralization processes which involve freezing are typically representative of processes the efficiency of which may be substantially increased through adoption of direct-contact heat exchange, and, accordingly, a freeze desalting process for sea water has been chosen as an illustrative case for reference in describing the details of this invention.

Conventional freeze desalting conversion processes comprise the operations of partially freezing sea water by direct-contact with a flashing oil, e.g., butane; separating the ice crystals from the resulting brine; melting the separated ice as by direct-contact with oil vapors which condense and are returned to the freezer, and withdrawing product water from the melter. Inasmuch as freeze conversion processes compete with other sea water conversion processes, economy of operations is a predominating factor, practically determinative of commercial success of the process; therefore, all means for practically increasing efficiencies, especially of conserving refrigeration, should be employed. Thus, for example, the refrigeration in the brine and in the product water is employed to pre-cool the incoming sea water.

Shell and tube heat exchangers have many disadvantages including high initial and maintenance costs, growth of marine life in the case of sea water treatment, deposition of scale, and they do not effect heat exchange to the optimum extent available.

Recent developments in sea water freeze conversion processes include the use of another liquid for heat transfer purposes, the same being relatively nonvolatile when compared with the flashing oil, butane, a preferred oil for liquid-liquid heat transfer being gasoline, more particularly, octane. Improved efficiency is obtained by passing the heat-transfer oil through a cycle in which it is pumped through a product-water contactor and through a brine contactor to cool the oil, and then passing the two cold oil streams to a sea water pre-cooling contactor. Such liquid-liquid contactors may be of simple construction and still attain high heat-transfer efficiency without the above-mentioned disadvantages of shell and tube heat exchangers.

The efficiency of a liquid-liquid contactor increases as the liquids are more intimately mixed; but more intimate mixing makes the desired ultimate separation more difficult. In an oil-water contactor which provides for intimate mixing but has no provision for effecting increased coalescence of the lighter liquid for separation purposes, the liquid column has to be relatively high or large and (or) the flow rate relatively low in order to allow for coalescence. We have found that coalescing of the lighter liquid from an intimately mixed phase of lighter and heavier liquids may be quickened by causing a reduction in rate of flow of the mixed phase in the column at the point where coalescence is desired, by imparting a change in direction of flow, and by providing an obstruction over which the mixed phase flows into a quiescent zone where further separation may occur.

It is an object of this invention to provide improved process and apparatus for continuous counterflow direct-contact treatment between two immiscible liquids of different densities for appreciably quickening coalescence of the lighter liquid in a layer above the mixture of the liquids being treated.

Another facet of this invention relates to handling of matter which separates at the interfaces of the two immiscible liquids. Sea water contains various substances such as proteins, lipides, and other high molecular weight organic compounds, and commercial water, such as brackish and waste waters, contains high molecular weight compounds and rust. When oil is mixed with such waters, these substances migrate to the interfaces in the mixed oil-water system and appear as a liquid film at the interfaces of the two liquids. Such film has a high viscosity and surface tension, and once formed is insoluble in either liquid. It is known as rag, and is a commonly experienced problem in practically all liquid-liquid contact systems. The rag tends to float to the top of the mixed phase in a liquid-liquid contactor.

It is another object of this invention to provide improved process and apparatus of the above-mentioned character and which is adapted for easy and simple removal of rag.

Further objects and advantages of the invention will appear in the course of the following part of this specification, wherein the details of construction and mode of operation of a preferred embodiment of a contactor for pre-cooling sea water are described with reference to the accompanying drawing, in which:

FIG. 1 is a central vertical section through the contactor with the pipe end instrument attachments thereof being shown in elevation and with the valves thereof being shown by graphical drawing symbols; and, FIG. 2 is a cross section through the contactor taken upon a plane indicated by line 2–2 on FIG. 1.

Referring to the drawing in greater detail, the illustrated contactor comprises a tank, designated generally by reference numeral 10, designed for effecting continuous counterflow direct-contact heat exchange between sea water and cold oil, e.g., octane, for pre-cooling the sea water in a freeze desalting conversion process. Tank 10 comprises a cylindrical tower 12 of circular cross-section and a capital 13 atop the tower. The cylindrical side wall of the tower is designated by numeral 15, and that of the capital by numeral 16. The tower has a dished bottom wall 18 provided at its center with an outlet opening 19 to which is connected a pipe 20 for continuously withdrawing chilled sea water from the tank. The top wall of the tank is designated by reference numeral 22, it being the top wall of the capital 13, and in the illustrated embodiment bulge upwardly and provided at its center with an outlet opening 23 to which is connected a pipe 24 for continuously withdrawing warmed oil from the tank. The inlet opening through which sea water is continuously admitted to the tower is designated by numeral 26, and the inlet opening through which cold oil is continuously admitted is designated by numeral 27. The side wall 15 of the tower continues downwardly below the bottom wall 18 as a skirt 29 provided with a flanged foot 30 for supporting the tank in a vertical position. The illustrated tank is equipped with conventional manholes 31 and a valve-controlled relief vent 32.

At the upper end of the tower the side wall 15 thereof continues upwardly into the capital 13 as a cylindrical extension 34 the top edge 35 of which is disposed in a horizontal plane spaced below the top wall 22. In the lower part of the capital 13 is a frustoconical wall 31 joining the capital to the side wall 15 of the tower and providing an annular trough 38 circumscribing the tower extension 34, such trough being hereinafter referred to as a collecting zone or chamber.

The inlet opening 26 for sea water to be treated is spaced below the top edge 35 of tower 12 and accommodates an injector tube 40 with perforations 40′ and extending diametrically in the tower for connection to a sea water supply pipe 41. The inlet opening 27 for oil is spaced above the bottom wall and accommodates as injector tube 42 with slits 42′ and extending diametrically in the tower for connection to an oil supply pipe 43. Between the inlet injectors 40 and 42 is an axially arranged series of uniformly spaced horizontal distribution plates 45 secured around their peripheries to the inside of the tower 12 and each being provided with numerous apertures 46. These distribution plates provide for intimate mixing of water from injector 40 and oil from injector 42, the water passing downwardly through certain of the apertures 46 in each plate and the oil passing upwardly through others of the apertures. At the upper end of the tower extension 34 is a horizontal screen 47.

In the drawing there are two reference lines, 50 and 51, representing horizontal planes through the tower. The lower reference line 50 is at a level below oil injector 42 while the upper reference line 51, is at a level spaced slightly above the overflow edge 35. Reference line 50 indicates the general level of separation or interface between the settled water in the bottom of the tank and the mixed dense phase of oil in water, and reference line 51 indicates the general location of a rounded interface between separated oil and the mixed dense phase of oil and water which bulges up beyond the edge 35 into the capital. The column of liquid in the tank 10 completely fills the tank, extending from bottom wall 18 to top wall 22, and comprises three superimposed zones, i.e., a bottom settling zone 53 which extends from and below reference line 50 for a layer of settled water, a top decanting zone 54 which extends from and above reference line 51 for a layer of separated oil, and an intermediate contacting zone 55 in the tower between the top and bottom zones for the mixed dense phase of oil and water. It is to be appreciated, however, that the levels 50 and 51 are not sharply defined but vary slightly as the rates of inlet of water and of oil may vary.

The flow rates through any of the inlet pipes 41 and 43 and outlet pipes 20 and 24 is determined by controlling the flow rates through the other three pipes. In the illustrated embodiment the rate of oil draw-off through pipe 24 is determined by controlling the rates of flow through inlets 41 and 43 and water outlet 20. The flow control means for outlet 20 also regulates the level of settled water at reference line 50. There is a conventional liquid level controller 57, e.g., float operated, connected by tubes 58 and 59 to the inside of the tower and by an air supply hose 60 to valve 61 in the water outlet pipe 20, for controlling withdrawal of cold sea water from the tank in response to the height of level 50. It will be apparent that to those skilled in the art of liquid level controllers, that should the level of settled water rise appreciably above the reference line 50, the liquid level controller 57 will operate to increase the flow through the valve 61, and should the level of water drop appreciably below the reference line 50, operation of the liquid level controller 57 will affect the control valve 61 to restrict the flow of water through the pipe 20.

There is another liquid level controller 63 connected by tubes 64 and 65 at the side wall of the capital 13 for regulating a valve 66 in a pipe 67 to control withdrawal of separated water from the collecting zone 38. In the illustrated embodiment the pipe 67 returns the separated water from the collecting zone to the tower, here through an inlet opening 68 accommodating a perforated injector 69 which extends radially inward of the tower just below the uppermost distribution plate 45. The valve 66 is operatively connected to the liquid level controller 63 by an air tube 70, to effect flow of air to the valve 66 from a conventional instrument supply source of air (not shown). There is another pipe 72 connected to the collecting chamber 38 and controlled by a valve 73 for withdrawal of rag from the collection chamber as will be described hereinafter.

For a full description of the mode of operation of the apparatus of the invention by reference to the illustrated contactor, it is one designed to handle about 600 gals. of sea water per minute and to reduce the temperature thereof from a representative incoming temperature of 65° F. to an outlet temperature ranging from about 32° to 38° F. by treatment with octane at an inlet temperature range from about 29° to about 35° F. A contactor of the illustrated design for handling this capacity may be about 60 ft. high, the diameter of the tower 12 being about 11 ft. and that of the capital 13 about 13 ft. The specific heat of octane being roughly about 0.6, the amount of octane passing through the contactor in order to effect the extent of cooling of sea water indicated, is from about 1.6 to 2.2 parts by weight of octane to one part of water, preferably about 1.8 parts octane to one part of water. The illustrated contactor contains eleven distribution plates 45.

As cold oil is introduced through injector 42 and sea water through injector 40, the water moves downwardly in the tower and the oil travels upwardly in the tower with the two liquids being mixed intimately because of the presence of the distribution plates 45. There being a greater volume of oil than of water, the state of the liquid mixture in the intermediate zone 55 is one of a small discrete droplets of oil, each surrounded by a film of water. Rag develops at the interfaces of the oil droplets and the water films. Though the water injector 40 is located below the rounded interface between the dense phase and separated oil, and rising dense phase in the intermediate zone carries water above the water inlet point at 40. The perforated tray or screen 47 at the top of the tower and such rag as adheres to the screen have the effect of increasing coalescence of the oil.

The collecting zone 38 quickens coalescing of the oil droplets for separation at the top of the liquid column. But for such collecting zone it would be necessary to substantially increase the height of the tower 12 above the water inlet 40 in order to realize appreciable coalescing of the oil for separation as a top layer to be withdrawn from the tank. The capital 13 being of larger cross-sectional size than the tower provides an enlargement or expansion chamber for the column of liquids in the tank and thereby effects a decrease in rate of flow upwardly in the column at the overflow edge 35. As the mixed dense phase of droplets of oil in water reaches the level of the overflow edge 35, its rate of flow upwardly is decreased with the result that the oil coalesces more quickly. Much of the mixed phase exudes radially outward and over the edge 35 which constitutes a narrow barrier further enhancing coalescence of oil droplets. Furthermore, because of the relatively quiescent state in the collecting chamber 38 oil separation is quickened. The rag at the interfaces of oil bubbles and water film in the dense phase of the intermediate zone collects along the interplane between separated oil and water in the collecting chamber.

The separated water in the collecting chamber 38 is continuously withdrawn by the valve controlled pipe 66 through operation of the level controller 63 thereby to maintain the interplane between separated oil and water in the collecting chamber below the level of the overflow edge 35. As rag accumulates in the collecting chamber at the interplane of separated oil and water it may be intermittently withdrawn through the pipe. The rate of withdrawal of processed water coupled with metered rates of liquid inlet determines the flow rate of oil withdrawn through the top outlet pipe 21.

While the invention has been described in connection with a process and apparatus for cooling sea water through liquid-liquid heat exchange with octane, in what is conceived to be the most practical and preferred embodiment therefore, it is to be understood that this description is illustrative only, not intended to limit the invention, and that the invention is to be accorded the full scope of the claims.

We claim:

1. A process for counterflow direct-contact treatment between two immiscible liquids of different densitites comprising the steps of maintaining in a tank a top decanting zone of a layer of the lighter liquid, a bottom settling zone of a layer of the heavier liquid and an intermediate contacting zone of a layer of an intimate mixture of the two liquids, introducing the lighter liquid at the bottom of the contacting zone and the heavier liquid below but proximate the top of the contacting zone, mixing said liquids in the contacting zone, withdrawing lighter liquid from the decanting zone and the heavier liquid from the settling zone, passing mixed liquids from the contacting zone radially outward at the top of the contacting zone into a collecting zone open to the decanting zone whereby that portion of the mixed liquid received in the collecting zone separates with an interplane between separated lighter liquid and settled heavier liquid in the collecting zone, and withdrawing settled heavier liquid from the collecting zone to maintain said interplane below the top of the contacting zone.

2. A process for continuous counterflow direct-contact heat exchange between two immiscible liquids of different densities and temperatures, comprising the steps of maintaining in a tank a top decanting zone of a layer of the lighter liquid, a bottom settling zone of a layer of the heavier liquid and an intermediate contacting zone of a layer of an intimate mixture of the two liquids, continuously introducing the lighter liquid at the bottom of the contacting zone and the heavier liquid below but proximate the top of the contacting zone, continuously mixing said liquids in the contacting zone, continuously withdrawing lighter liquid from the decanting zone and the heavier liquid from the settling zone, continuously passing mixed liquids from the contacting zone radially outward at the top of the contacting zone into a collecting zone extending below the top of the contacting zone and open to the decanting zone whereby that portion of the mixed liquid received in the collecting zone separates with an interplane existing between separated lighter liquid and settled heavier liquid in the collecting zone, and continually withdrawing settled heavier liquid from the collecting zone to maintain said interplane below the top of the contacting zone.

3. The process of claim 2 wherein the introduced heavier liquid is sea water at about 65° F., the introduced lighter liquid is octane at a temperature range of from 29° to 35° F., the withdrawn water from the settling zone is at a temperature range of from 32° to 38° F., the withdrawn octane is at a temperature of about 62° F., and the ratio of introduced octane to introduced water is from 1.6 to 2.2 parts by weight of octane to one part of water.

4. A process for continuous counterflow direct-contact heat exchange between water and oil comprising the steps of maintaining a vertical column of water, the column comprises three superimposed zones, said zones being respectively a top decanting zone of separated oil, a bottom settling zone of separated water and an intermediate contacting zone of an intimate mixture of oil and water, continuously introducing oil at the bottom of the contacting zone and water below but proximate the top of the contacting zone, continuously mixing said liquids in the contacting zone, continuously withdrawing separated oil from the decanting zone and separated water from the settling zone, continuously passing mixed oil and water from the top of the contacting zone radially outward into a collecting zone open at its top to the decanting zone for quickening coalescence of the oil and whereby the oil and water mixture which passes into the collecting zone separates and forms an interplane between the separated oil and water in the collecting zone, and continually withdrawing settled water from the collecting zone to maintain said interplane at a level below the top of the collecting zone.

5. The process of claim 4 including the step of returning the water withdrawn from the collecting zone to the contacting zone.

6. The process of claim 4 wherein the water to be treated contains matter which separates at the interfaces of the oil and water and collects as rag at said interplane, and including the step of withdrawing the rag from the collecting zone.

7. Apparatus for continuous counterflow direct-contact heat exchange between two immiscible liquids of different densities and temperatures, comprising a tank defining three superimposed zones, said zones being respectively a top decanting zone for a layer of the lighter liquid, a bottom settling zone for a layer of the heavier liquid and an intermediate contacting zone for a relatively thick layer of a mixture of the two liquids, means for continuously introducing the lighter liquid at the bottom of the contacting zone and the heavier liquid below but proximate the top of the contacting zone, means for continuously mixing said liquids in the contacting zone, means for continuously withdrawing lighter liquid from the decanting zone and the heavier liquid from the settling zone, the tank also defining a collecting zone extending downwardly from the top of the contacting zone and open to the decanting zone whereby liquid mixture from the contacting zone continuously passes radially outward at the top of the contacting zone into the collecting zone with an interplane existing between separated lighter liquid and settled heavier liquid, and means for continually withdrawing settled heavier liquid from the collecting zone to maintain said interplane below the top of the contacting zone.

8. Apparatus according to claim 7 in which said mixing means comprises an axially arranged series of spaced horizontal distribution plates in said contacting zone.

9. Apparatus according to claim 7 and comprising means operatively connected to the heavier liquid withdrawing means from the settling zone for controlling the rate of heavier withdrawal in response to the height of the level between said settling and intermediate zones.

10. Apparatus according to claim 7 and comprising means operatively connected to the withdrawing means from the collecting zone for controlling the rate of liquid withdrawal from the collecting zone in response to the height of said interplane.

11. A contactor for continuous counterflow direct-contact heat exchange between water and oil, comprising a vertical cylindrical tower, a capital atop the tower of larger cross-sectional area and axially aligned with the tower, the upper end of the tower being an edge defining an opening for flow of liquids from the tower to inside the capital, the capital extending downwardly beyond said edge to define a collecting chamber circumscribing the upper end portion of the tower, an injector below but proximate said edge for admitting water to be treated into the tower, an injector above but proximate the bottom of the tower for admitting oil into the tower, an outlet pipe for separated oil from the top of the capital, an outlet pipe for settled water from the bottom of the tower and including a first valve, an axially arranged series spaced horizontal and perforated distribution plates between said injectors for mixing oil and water, a horizontal screen at said edge, an outlet tube for separated water from the collection chamber and including a second valve, a liquid level controller connected to the inside of the tower and to said first valve for controlling the flow through said first valve in response to the level between separated water in the tower and mixed oil and water to maintain said level below the lowermost distribution plate, a liquid level controller connected to inside of the tower and to said second valve for controlling the flow through said second valve in response to the height of the interface between separated water and oil in the collecting chamber to maintain said interface below said edge.

12. A contactor according to claim 11 and including an outlet tube connected to the inside of the collecting chamber above said valved outlet tube from the collecting chamber for withdrawal of rag which accumulates at said interface.

13. Apparatus for continuous counterflow direct-contact heat exchange between two immiscible liquids of different densities and temperatures, comprising a tower defining a bottom settling zone for a layer of the heavier liquid and a contacting zone above the settling zone for a mixture of the two liquids, means for introducing the lighter liquid at the bottom of the contacting zone and the heavier liquid below but proximate the top of the contacting zone, means for withdrawing settled heavier liquid from the settling zone, tank means connected to the top of the contacting zone to receive liquid mixture from the contacting zone, said tank means being larger in cross-sectional size than the tower to provide for separation of the mixture, said tank means having a lower end portion located below the top of the contacting zone, said lower end portion providing a collecting zone for liquid mixture and being radially spaced from said contacting zone and means for withdrawing settled heavier liquid from said collecting zone.

References Cited by the Examiner
UNITED STATES PATENTS

| | | | |
|---|---|---|---|
| 2,176,806 | 10/1939 | Schuessler et al. | 23—310 |
| 2,628,894 | 2/1953 | Langmyhr | 23—310 |
| 2,759,800 | 8/1956 | Hill | 23—270.5 |
| 2,767,068 | 10/1956 | Maycock et al. | 23—310 |
| 2,930,753 | 3/1960 | McMahon | 210—21 |
| 2,967,825 | 1/1961 | Baniel | 210—21 |
| 3,062,627 | 2/1962 | Zuiderweg | 23—270.5 |
| 3,178,268 | 4/1965 | Lindstrom | 23—270.5 |

MORRIS O. WOLK, *Primary Examiner.*

EDWARD G. WHITBY, *Examiner.*